(12) United States Patent
Maloizel et al.

(10) Patent No.: US 6,304,063 B2
(45) Date of Patent: Oct. 16, 2001

(54) LITHIUM ION BATTERY UNIT ADAPTED TO BE CHARGED BY AN ALKALINE CHARGER

(75) Inventors: Serge Maloizel, Trois Palis; Stéphane Jaud, St Yrieix sur Charente; Philippe Boisumault, Saint Cybardeaux, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/769,357

(22) Filed: Jan. 26, 2001

(30) Foreign Application Priority Data

Feb. 3, 2000 (FR) .................................................. 00 01349

(51) Int. Cl.$^7$ .................................................. H01M 10/46
(52) U.S. Cl. ........................................... 320/134; 320/136
(58) Field of Search .................................... 320/127, 128, 320/132, 134, 136

(56) References Cited

U.S. PATENT DOCUMENTS 4,392,101 * 7/1983 Saar et al. .
5,296,797 * 3/1994 Bartlett .
5,637,413 6/1997 Fernandez et al. .

FOREIGN PATENT DOCUMENTS 0 525 744 A1   2/1993 (EP) .

\* cited by examiner

*Primary Examiner*—Edward H. Tso
(74) *Attorney, Agent, or Firm*—Sughrue, Mion, Zinn, Macpeak & Seas, PLLC

(57) ABSTRACT

A battery unit includes at least one storage cell, two external connecting terminals, one of which is positive and the other of which is negative, and a safety circuit connected to prohibit entry of charging current into the cell as soon as a voltage applied between the external connecting terminals is greater than a particular maximum safety voltage. An additional protection circuit is connected between the external terminals and the safety circuit to prohibit the entry of charging current into the safety circuit as soon as the voltage applied between the external connecting terminals is greater than a particular maximum charging voltage which is less than the maximum safety voltage. This prevents the safety circuit operating unnecessarily.

3 Claims, 1 Drawing Sheet

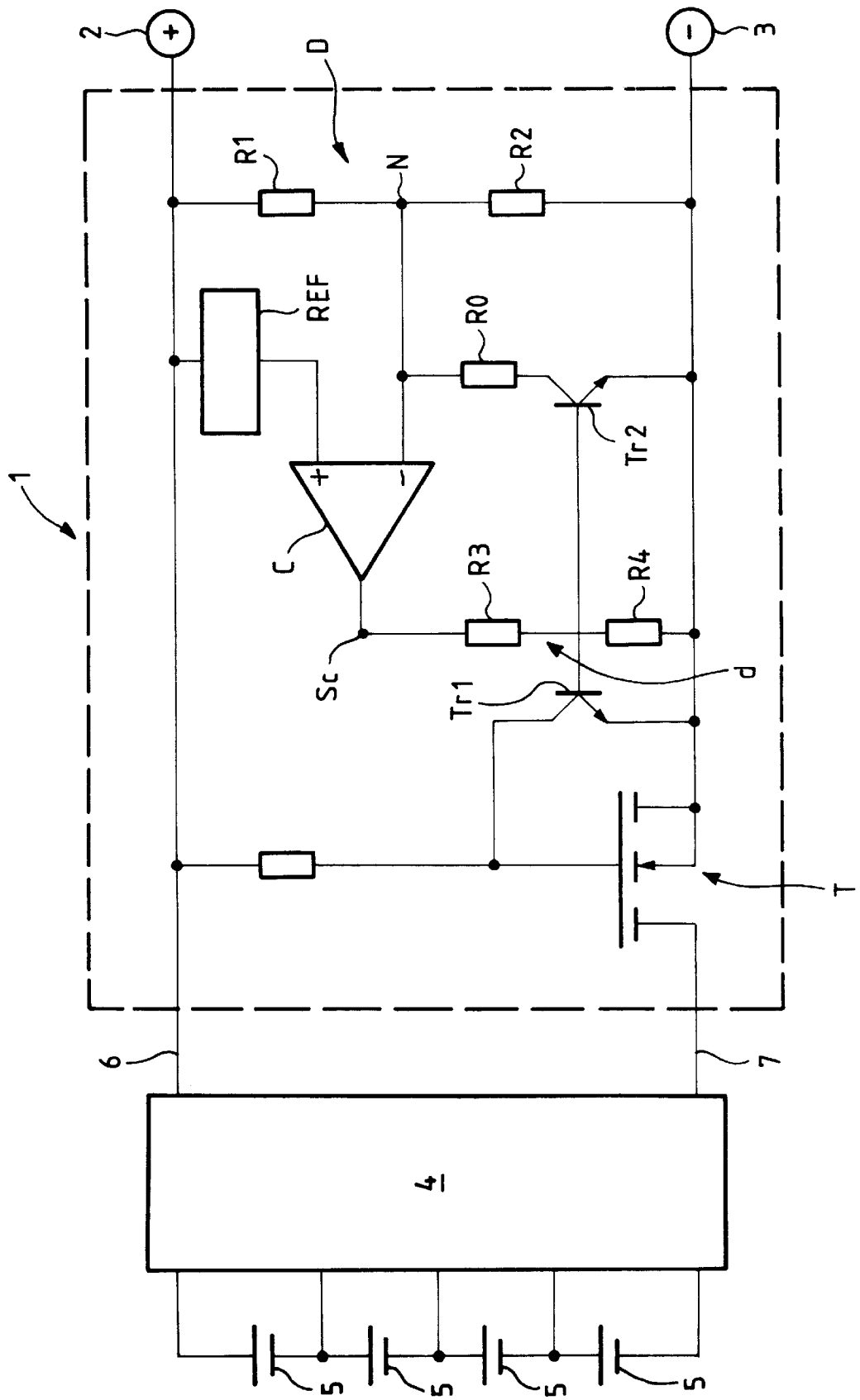

LITHIUM ION BATTERY UNIT ADAPTED TO BE CHARGED BY AN ALKALINE CHARGER

BACKGROUND OF THE INVENTION

1. Field of the Invention

The invention relates to a battery unit including at least one storage cell, two external connecting terminals, one of which is positive and the other of which is negative, and a safety circuit connected to prevent entry of charging current into the cell as soon as a voltage applied between said external terminals is greater than a particular maximum safety voltage.

2. Description of the Prior Art

This kind of battery unit is more particularly intended for powering portable devices such as mobile telephones, camcorders and other devices. Its safety circuit is designed to protect each cell against failure of the charger leading to an overvoltage between the external connecting terminals of the battery unit, for example. A safety circuit of the above kind is described in U.S. Pat. No. 5,547,775. Its role is therefore to prevent deep discharging and overcharging of each cell of the battery unit, for example to prevent a short circuit across the external connecting terminals destroying the cell. It primarily consists of a plurality of excessive overcharging and excessive discharging detector circuits, a plurality of discharge circuits and a plurality of switching circuits associated with the respective cells of the battery unit. Each cell of the battery unit is therefore connected to an overcharging and deep discharging detector circuit, a discharge circuit and a switching circuit. In this way the safety circuit described in the aforementioned document is capable of bringing about discharging of each cell of a battery unit if it detects that the cell has an excessive voltage at its terminals or preventing current being drawn from a cell if it has detected that the cell concerned is deeply discharged.

Battery units which include lithium ion cells have a significant advantage in terms of stored energy density and weight saving but lithium ion cells cannot withstand overvoltages at their terminals. The addition of a safety circuit as indicated above to a lithium ion cell battery unit improves the performance and reliability of the battery unit.

From the charging point of view, the various types of cell have different requirements, and at present the chargers employed must be matched to the type of cell that they are intended for charging. A charger for an alkaline battery unit, for example, modulates its output voltage to generate a constant charging current in the battery unit that it is charging, whereas a lithium ion battery unit charger maintains a constant voltage at the external connecting terminals of the battery unit it is charging.

If a lithium ion battery unit is charged with an alkaline charger, on approaching the end of charging the resistance of the lithium ion cells increases and the charger therefore increases the applied voltage to maintain a constant current, until the point is reached where the voltage applied is greater than the maximum safety voltage of the lithium ion battery unit. The safety circuit of the lithium ion battery unit will then open to isolate the cells from the charger, which represents the end of charging.

If a user who has an alkaline charger regularly uses it to charge a lithium ion battery unit, the safety circuit is activated during each charging cycle, although it is intended to operate only as a final resort. This mode of use compromises the reliability of the battery unit: the fact that the safety circuit is regularly activated reduces its reliability and consequently the reliability and safety of the battery unit are themselves reduced.

This kind of situation occurs frequently: in professional video batteries, for example, the interfaces between the battery unit and the camera are fixed and a lithium ion battery unit therefore has the same interface as an alkaline battery unit. A user can therefore always connect a lithium ion battery unit to an alkaline charger, which has the drawback of causing the battery unit to operate regularly in a safety mode.

The object of the invention is to remedy these drawbacks.

SUMMARY OF THE INVENTION

To this end, the invention provides a battery unit including at least one storage cell, two external connecting terminals, one of which is positive and the other of which is negative, and a safety circuit connected to prohibit entry of charging current into the cell as soon as a voltage applied between the external connecting terminals is greater than a particular maximum safety voltage, in which battery unit an additional protection circuit is connected between the external terminals and the safety circuit to prohibit the entry of charging current into the safety circuit as soon as the voltage applied between the external connecting terminals is greater than a particular maximum charging voltage which is less than the maximum safety voltage.

With the above arrangement, the safety circuit of a lithium ion battery unit is no longer activated each time that the battery unit is charged by an alkaline charger, which helps to maintain the reliability of the battery unit at a satisfactory level, whether it is used with an alkaline charger or with a lithium ion charger.

In one particular embodiment of a battery unit according to the invention, the additional protection circuit includes a MOSFET switch which is controlled to prohibit or authorize the entry of a charging current into the safety circuit. Hereinafter the protection circuit is referred to as closed or open according to whether this MOSFET is turned on or off. A problem that is frequently encountered in controlled switching is oscillation: because of slight disturbances to the voltage caused by opening the circuit, the protection circuit finds itself in a configuration in which it should close again. If precautions against this are not taken, the circuit begins to oscillate indefinitely at the time it should merely open. In one particular embodiment of the protection circuit according to the invention, the MOSFET switch is controlled by a comparator having a first input which receives the maximum charging voltage and a second input which receives the voltage applied to the external connecting terminals, the second input being connected to the external connecting terminals via a divider bridge having a division ratio that varies to introduce hysteresis into the control of the switch. The resulting hysteresis between opening and closing of the switch helps to eliminate the oscillation problem. The circuit closing voltage is made less than the maximum charging voltage (above which the circuit is opened). In this way, when the circuit is opened, the input voltage can fall to some degree (whilst remaining greater than the closing voltage) without closing the circuit. The circuit obtained in this way is stable and is not disturbed by voltage variations caused by its operation.

BRIEF DESCRIPTION OF THE DRAWING

One embodiment of a battery unit according to the invention is described in more detail hereinafter and shown in the single FIGURE of the accompanying drawings.

DETAILED DESCRIPTION OF THE PREFERRED EMBODIMENT

The battery unit according to the invention shown in the FIGURE includes a protection circuit 1 connected between positive and negative external connecting terminals 2, 3 of the battery unit and a safety circuit 4. The safety circuit 4 is connected to at least one lithium ion storage cell, in this example to four cells 5 connected in series. As can be seen in the FIGURE, each cell is connected by its two terminals to the safety circuit 4 and the safety circuit 4 also has two terminals 6 and 7 connected to the external connecting terminals 2 and 3 via the protection circuit 1.

The protection circuit 1 includes a voltage divider bridge D connected to the external connecting terminals 2 and 3 and mode up of resistors R1, R2 and R0. The protection circuit 1 further includes a comparator C having a + first input receiving a reference voltage REF and a − second input receiving the voltage applied between the external connecting terminals 2 and 3 via the divider bridge D. The output Sc of the comparator C controls a MOSFET switch T which prohibits or authorizes entry of charging current into the safety circuit 4. As can be seen in the FIGURE, the output Sc of the comparator is connected to the control input of the switch T via a second voltage divider bridge d made up of the resistors R3 and R4 and a transistor Tr1 and to the voltage divider bridge D via the second divider bridge d and a transistor Tr2.

Depending on the value of the voltage applied to the transistor Tr1 by the output Sc of the comparator, the transistor is turned on or off, which commands opening or closing of the switch T.

One particular feature of the divider bridge D is that it introduces hysteresis into the protection circuit 1: the closing voltage, which closes the switch T, is less than the maximum charging voltage, which causes it to open. The divider bridge D includes the resistor R1 which is connected between the positive terminal 2 and a node N, the resistor R2 which is connected between the node N and the negative terminal 3, and the resistor R0 and the transistor Tr2, which are connected in series which are both connected between the node N and the negative terminal 3. In this way the voltage read by the comparator C is the voltage of the node N.

To introduce hysteresis between opening and closing, the protection circuit modifies the division ratio of the divider bridge D by inserting the resistor R0 into circuit by means of the transistor Tr2: if Tr2 is on, the divider bridge is made up of the resistors R1 and R0 in parallel with R2; if Tr2 is off the divider bridge is made up only of the resistors R1 and R2. The division ratio of the bridge D is therefore different according to whether the voltage applied by the output Sc of the comparator switches the transistor Tr2 on or off. In this way, the comparator overestimates the voltage between the two terminals of the battery unit if the protection circuit is open. For the protection circuit to close again, it is therefore necessary for the actual voltage between the two connecting terminals to drop sufficiently for it to be below the closing voltage, which corresponds to hysteresis between opening and closing the protection circuit.

There is claimed:

1. A battery unit including at least one storage cell, two external connecting terminals, one of which is positive and the other of which is negative, and a safety circuit connected to prohibit entry of charging current into said cell as soon as a voltage applied between said external connecting terminals is greater than a particular maximum safety voltage, in which battery unit an additional protection circuit is connected between said external terminals and said safety circuit to prohibit the entry of charging current into said safety circuit as soon as said voltage applied between said external connecting terminals is greater than a particular maximum charging voltage which is less than said maximum safety voltage.

2. The battery unit claimed in claim 1 wherein said additional protection circuit includes a MOSFET switch which is controlled to prohibit or authorize entry of a charging current into said safety circuit.

3. The battery unit claimed in claim 2 wherein said switch is controlled by a comparator having a first input which receives said maximum charging voltage and a second input which receives said voltage applied to said external connecting terminals and said second input is connected to said external connecting terminals by a divider bridge having a division ratio which varies to introduce hysteresis into the control of said switch.

* * * * *